Sept. 25, 1962 YOSHIAKI SUZUKI 3,055,283
CAMERA-BINOCULAR COUPLING MEANS
Filed Oct. 29, 1959 4 Sheets-Sheet 1
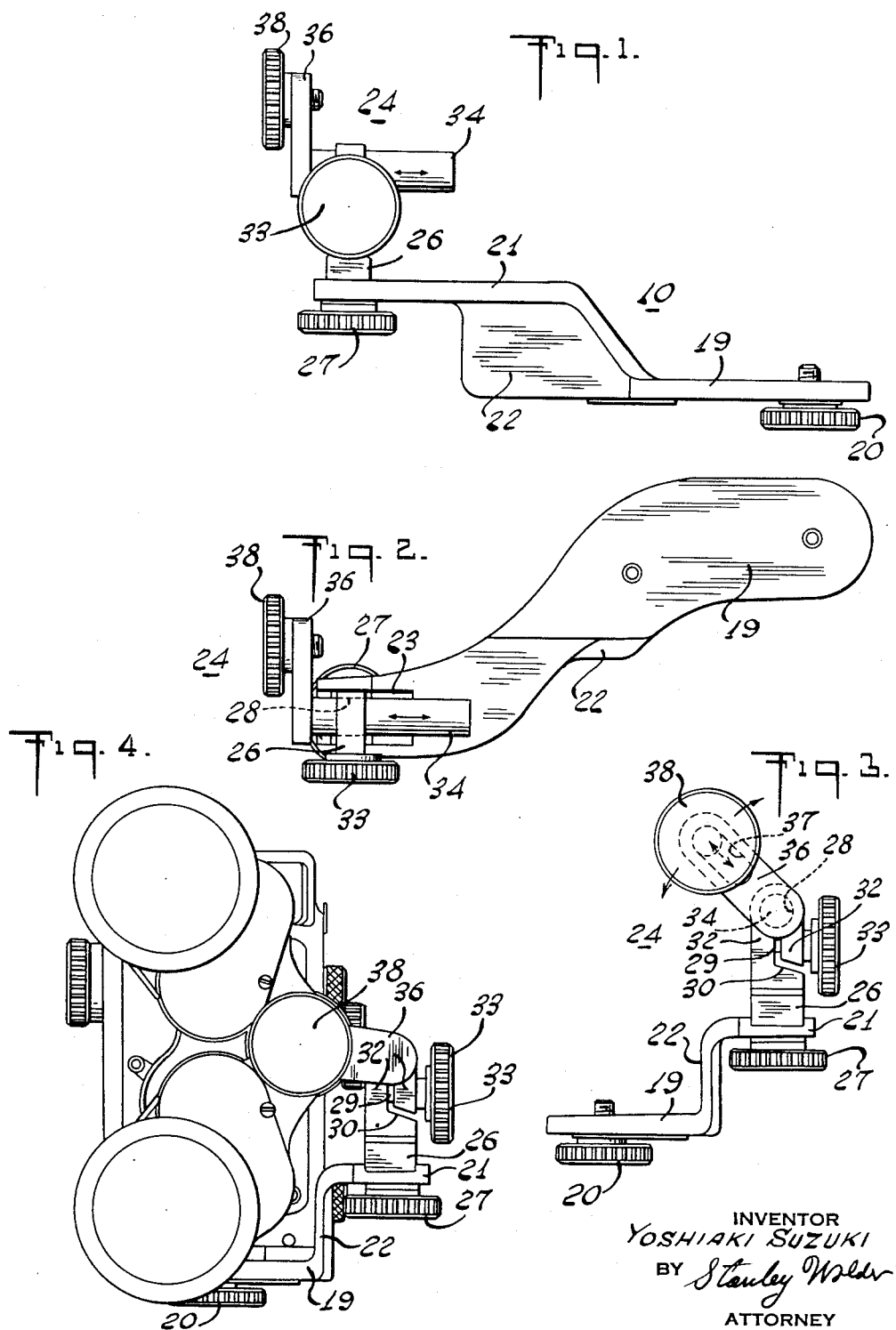
INVENTOR
YOSHIAKI SUZUKI
BY Stanley Welder
ATTORNEY Sept. 25, 1962 YOSHIAKI SUZUKI 3,055,283
CAMERA-BINOCULAR COUPLING MEANS
Filed Oct. 29, 1959 4 Sheets-Sheet 2

INVENTOR
YOSHIAKI SUZUKI
BY Stanley Wosder
ATTORNEY

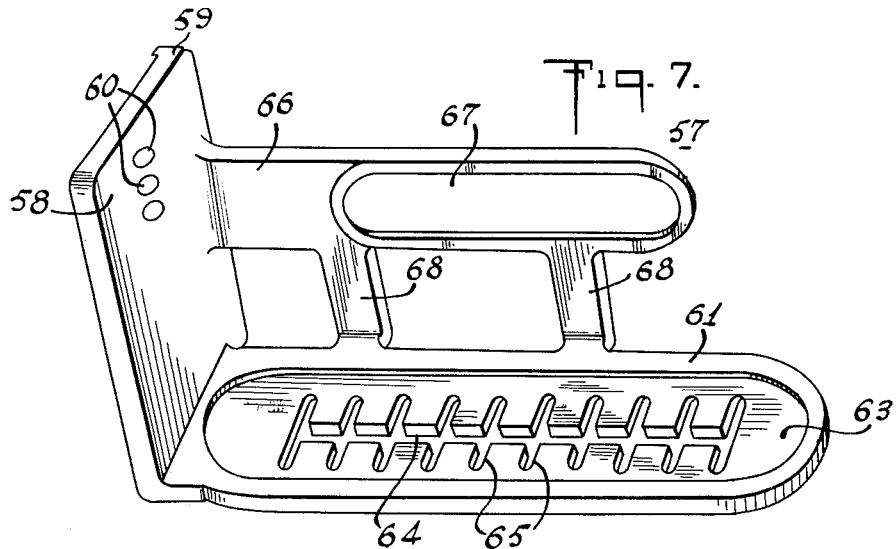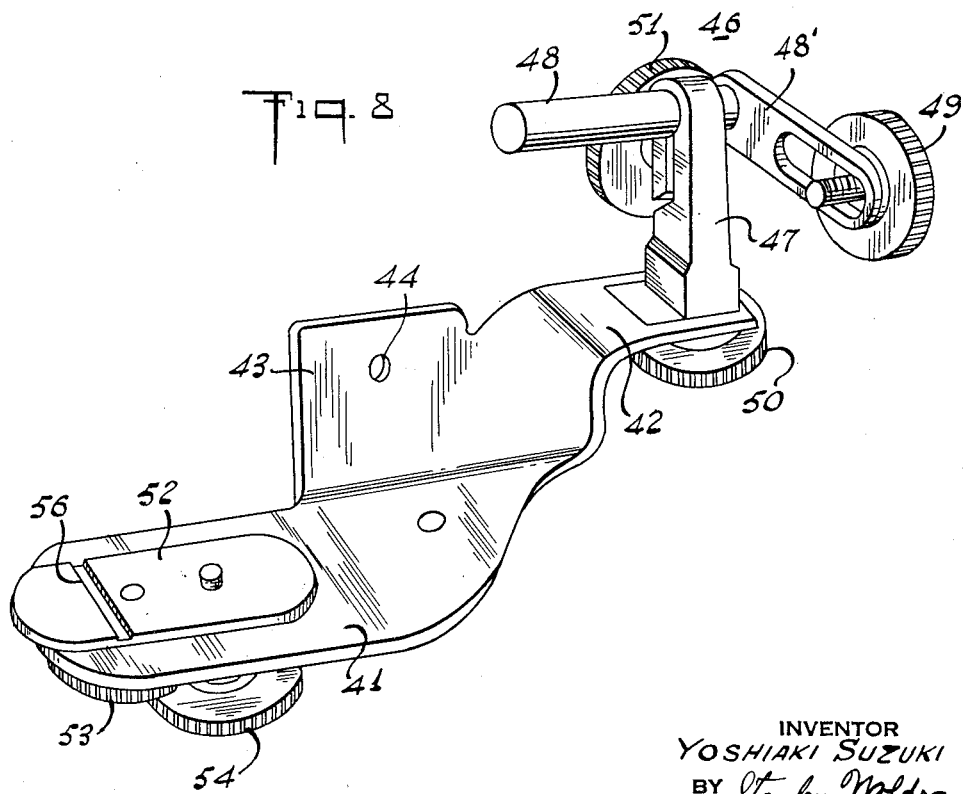

Sept. 25, 1962  YOSHIAKI SUZUKI  3,055,283
CAMERA-BINOCULAR COUPLING MEANS
Filed Oct. 29, 1959  4 Sheets-Sheet 4
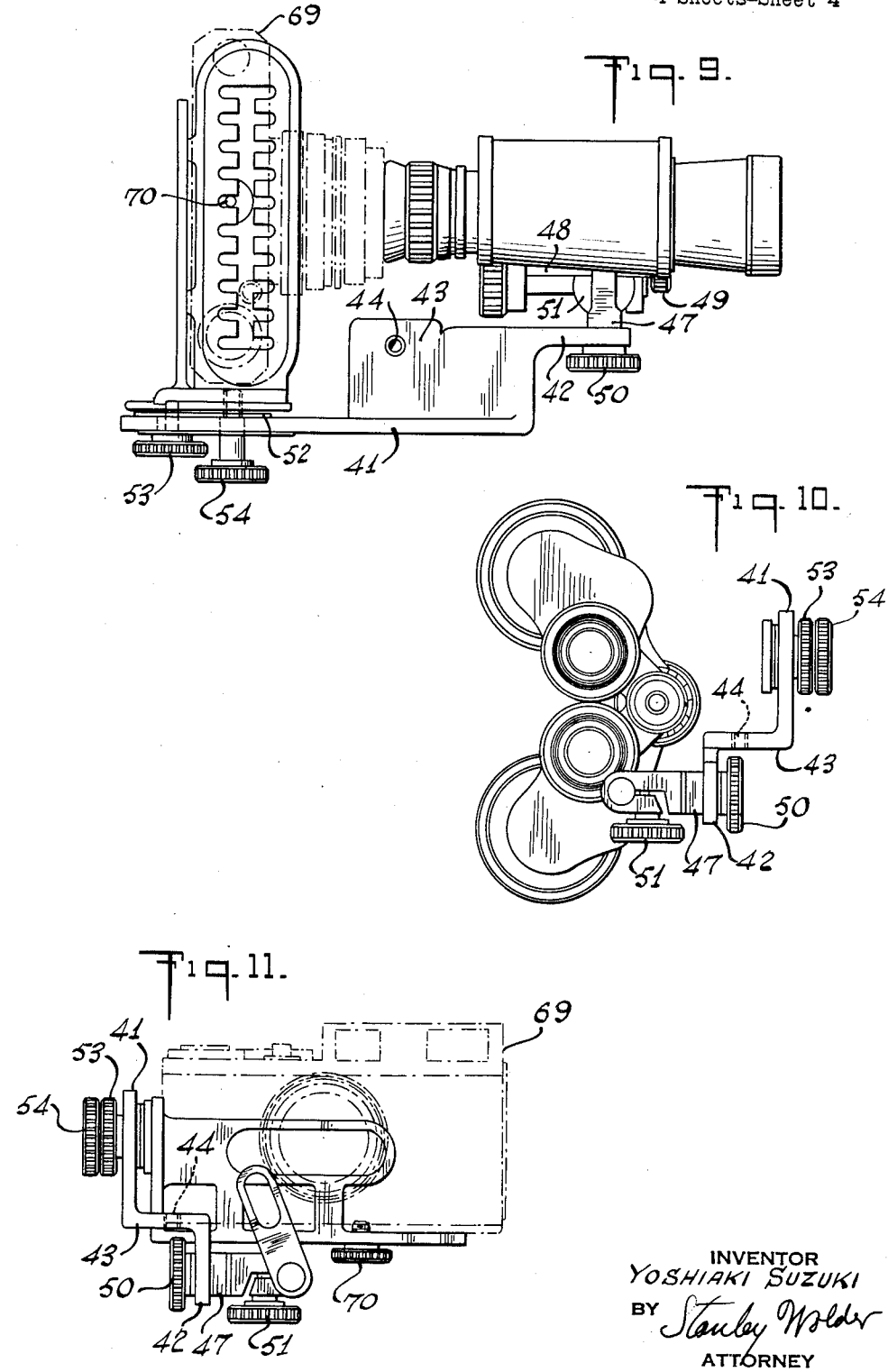
INVENTOR
YOSHIAKI SUZUKI
BY Stanley Wolder
ATTORNEY United States Patent Office
3,055,283
Patented Sept. 25, 1962

3,055,283
CAMERA-BINOCULAR COUPLING MEANS
Yoshiaki Suzuki, Tokyo, Japan, assignor to Taisei Optical Industry Co., Ltd., Saitama-ken, Japan, a corporation of Japan
Filed Oct. 29, 1959, Ser. No. 849,513
Claims priority, application Japan Jan. 27, 1959
8 Claims. (Cl. 95—86)

The present invention relates generally to novel camera accessory equipment and it relates more particularly to a novel device for mechanically coupling a binocular section to a camera whereby the binocular section functions with the camera lens as a telephoto system.

Binoculars have been heretofore employed as telephoto lenses with photographic cameras. However, the arrangements by which such use has been effected have been awkward and have lacked versatility and adaptability and have possessed numerous other drawbacks and disadvantages. As a consequence, the use of binoculars as camera telephoto lenses has been of a very limited nature.

It is therefore a principal object to provide a novel camera accessory.

Another object of the present invention is to provide a novel device for coupling a binocular to a photographic camera whereby the camera lens and the binocular lens system cooperate to form a camera telephoto lens system.

Still another object of the present invention is to provide a novel coupling device of the above nature characterized by its simplicity, ruggedness, versatility and low cost and its adaptability for use with a wide range of types and sizes of cameras and binoculars.

The above and other objects of the present invention will become apparent from a reading of the following description taken in conjunction with the accompanying drawings wherein;

FIGURE 1 is a side elevational view of a coupling member embodying the present invention;

FIGURE 2 is a top plan view thereof;

FIGURE 3 is a front elevational view thereof;

FIGURE 4 is a front elevational view of the improved device illustrated in use with a pair of prism type binoculars and a twin lens reflex camera;

FIGURE 7 is a perspective view of an improved camera bracket which may be employed with the coupling device;

FIGURE 8 is a perspective view of another embodiment of the present invention which may be employed with the bracket illustrated in FIGURE 7;

FIGURE 9 is a side elevational view of the bracket and coupling member illustrated in FIGURES 7 and 8 with a single lensed camera shown in broken line and a pair of binoculars;

FIGURE 10 is a rear elevational view of the coupling member and a pair of mounted binoculars; and FIGURE 11 is a front elevational view of the assembled coupling member and camera bracket, the camera being shown in broken lines.

In a sense the present invention contemplates the provision of a novel device for coupling camera and a pair of binoculars whereby to provide a telephoto lens system for the camera, the device comprising a camera mount adapted to releasably support a camera and an arm projecting forwardly from said camera mount and carrying at its leading end a universally adjustable mount for supporting a pair of binoculars with a lens system thereof in optical registry with the camera lens. With the aforesaid arrangement it is possible to readily and simply effect the accurate rigid mechanical and optical couplings between binoculars and cameras of various types. The versatility of the device is further increased by the provision of a camera bracket which is adjustably carried by the coupling device and is adapted to support a camera in a preselected position.

Figure 5:
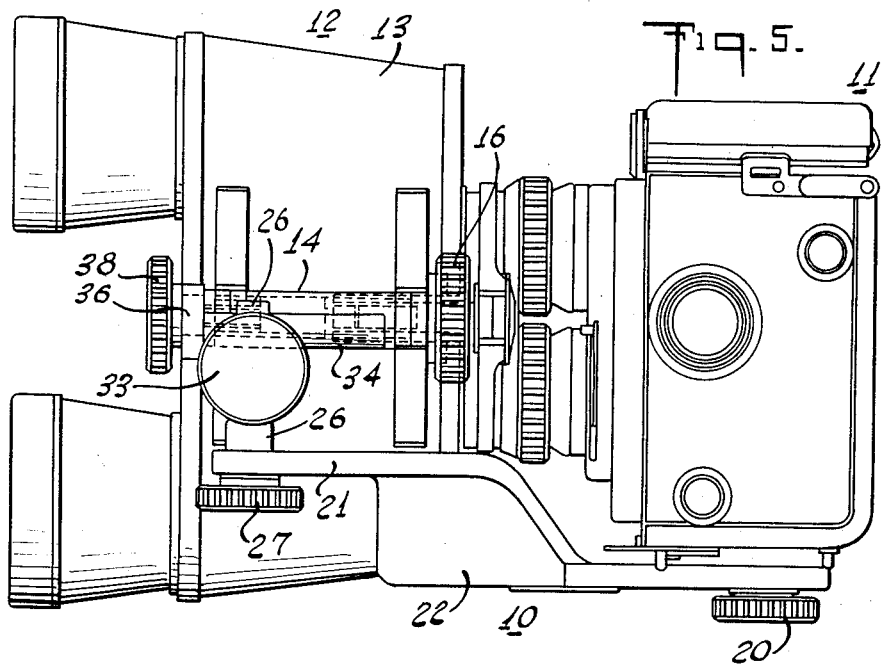
FIGURE 5 is a side elevational view of the assembly.
Figure 6:
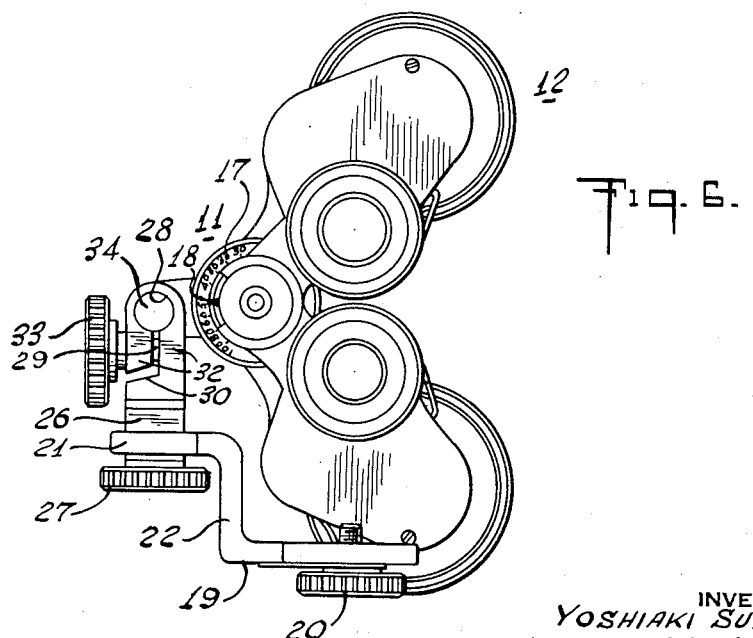
FIGURE 6 is a rear elevational view of the coupling device mounting a pair of prism binoculars.

Referring now to the drawings and more particularly to FIGURES 1 through 6 thereof which illustrate a preferred embodiment of the present invention the reference numeral 10 generally designates the improved coupling device which desirably associates a camera 11 of the conventional twin reflex type and a pair of binoculars 12. The binoculars 12 are preferably of the type described in the copending application of Yoshiaki Suzuki Serial No. 849,514 concurrently filed herewith and now abandoned, and includes a pair of barrel members 13 hinged to a support frame comprising an axial mounting member 14 having an axially tapped bore formed in its leading end. The binoculars 12 are focussed by means of a rotatable focussing wheel 16 having focus designating indicia 17 impressed on its trailing end face with which is associated a stationary indicator or pointer 18.

The coupling member 10 includes a rear camera mount or platform 19 carrying a rotatable headed lock screw 20 having a threaded shank extending above the face of the mount 19 and adapted to engage the correspondingly threaded socket of a camera 11 to releasably support the camera on the mount 19. An arm 21 extends longitudinally forward of the mount 19 and is transversely or vertically and laterally offset relative thereto and is reinforced and connected to the mount 19 by a vertical web 22. Formed in the top face of the arm 21 is a longitudinally extending groove 23.

A binocular supporting universally adjustable mount 24 comprises a vertical pedestal or post 26 having a base portion registering with the arm groove 23 and is secured to the arm 21 by a screw 27 having a shank passing through an opening formed in the arm 21 and engaging a corresponding tapped bore in the post 26. Extending longitudinally through the upper section of the post 26 is a circular aperture 28 which is split by a slot 29 depending therefrom and communicating with a face of the post 26 by way of an inclined slot 30 to delineate a pair of confronting legs 32, which, with the aperture 28 define a split collar clamp. The clamp may be closed by contracting the aperture 28 by means of a tightening screw 33 passing through an opening in one of the legs 32 and engaging an aligned tapped bore in the other leg 32.

A cylindrical rod 34 of circular cross section axially rotatably and longitudinally slidably registers with the post opening 28 and may be locked or clamped in any desired preset position by tightening the screw 33. Projecting transversely from the leading end of the rod 34 is a leg member 36 having a longitudinally extending elongated slot 37 formed therein. A binocular lock screw 38 registers with and is slidable along the slot 37. It is apparent from the above that the binocular support member, as defined by the lock screw 38, is universally adjustable in position relative to the camera mount 10 in that it is longitudinally adjustable toward and away from the camera mount 10 by the sliding movement of the rod 34, and is transversely, that is vertically adjustable and is laterally adjustable by rotating the rod 34 to swing the arm 36 and by sliding the lock screw 38 along the slot 37 in the arm 36. Thus the binocular supporting lock screw 38 is movable to any point along the three coordinates in a given space.

In employing the improved coupling device 10 the camera 11 is secured to the mount 19, with its lenses directed forwardly, by means of the lock screw 20. The binocular eye pieces are adjusted so that their center to center distance is equal to the center to center distance between the camera picture and viewing lenses and the binoculars are then loosely mounted on the leg 36 by bringing the screw into engagement with the threaded socket at the leading end of the binocular mount 14. The screw 33 is loosened to free the rod 34 and the binocular eye pieces are then brought into optical aligned registry with the camera lenses by manipulating the binoculars 12 where-with the rod 34 may be axially rotated and longitudinally slid and the screw moved along the slot 37. Upon the binoculars 12 being adjusted to the required position the screws 33 and 38 are tightened to complete the separable and adjustable rigid assembly of the binoculars and camera which may be employed for telephoto purposes and may be supported or mounted as desired, for example, on a tripod or the like. Focussing may be simply effected by adjusting the binocular focussing wheel 16 and determined either by way of the camera viewing screen or the indicia 17. It should be noted that in effecting and adjusting the assembly the camera lens is initially preset at infinity. In the event that further adjustments of the camera binocular arrangement may be desired this is effected merely by loosening the lock screw 33, manipulating the binoculars 12 and rod 34 and re-tightening the screw 33. While the assembly is illustrated as applied to a twin lens reflex camera it may be employed with other type cameras such as the single lens reflex or non-reflex type of camera.

In FIGURES 7 through 11 of the drawings there is illustrated another embodiment of the present invention which may be advantageously employed with the conventional single lens 35 mm. type camera. The coupling member 40 is somewhat similar to the previously described coupling member 10 and includes a camera mount 41 and a transversely and laterally offset forwardly projecting arm 42 joined to the mount 41 by a vertical web having a support accommodating opening 44 formed therein. A universally adjustable binocular mount 46 is carried by the leading end of the arm 42 and is similar in construction to the binocular mount 24 including the clamp post 47, slide rod 48, slotted leg 48' and the various locking and tightening screws 49, 50 and 51 respectively.

A longitudinally extending plate 52 is carried on the mount 41 and is adjustably affixed thereto by a lock screw 53 passing through a slot in the mount 41 and engaging a tapped bore in the plate 52. A second lock screw 54 also passes through a slot in the mount 41 and an opening in the plate 52 to permit the attachment of a camera bracket, as will be hereinafter set forth. Formed in the top face of the plate 52 is a tranversely extending groove 56.

In order to increase the flexibility and versatility of the present device there is provided a camera supporting bracket 57 which includes an end or bottom wall 58 provided with a depending lip 59 along its rear edge and having a plurality of laterally spaced tapped apertures 60 formed therein. Projecting perpendicularly from a side edge of the bottom wall 58 is an elongated base member 61 having a shallow recess 63 located on the inner face thereof. A longitudinally extending slot 64 is medially formed in the base member 61 and is intersected by a plurality of regularly longitudinally spaced transversely extending slots 65 communicating with the slot 64. Projecting from the end wall 58, adjacent the rear edge thereof is an arm 66 having an elongated aperture 67 formed therein and connected to the rear edge of the base member 61 by a pair of spaced connecting pieces 68.

A camera 69, illustrated as being of the non reflex, single lens 35 mm. type is snugly cradled in the bracket 57 with its threaded base socket registering with one of the slots 64—68. A conventional screw 70 passes through the slot and engages the threaded socket to securely lock the camera in position. The camera carrying bracket 57 is then mounted in position on the plate 52 with the lip 59 registering with the groove 56 and the screw 54 tightly engaging a preselected threaded opening 60 in the wall 58. The binoculars are then mounted on the leg 49 as aforesaid and the screws 49, 51 and 53 loosened. The camera lens is focussed to infinity and the binoculars and camera positions adjusted until one of the binocular sections is in optical aligned registery with the camera lens whereupon the screws 49, 51 and 53 are tightened to complete the unitary assembly. It should be noted that in the event the camera lens is not in a position where it may be properly coupled to the binoculars, the screw 70 may be loosened, the camera slid in the bracket 57 to a suitable position and the screw 70 retightened. The focus of the elephoto lens system may be adjusted by means of the focussing wheel 16 the focus distance being observed through the indicia 17. The assembled camera and binoculars may be employed and adjusted as in the previous embodiment the provision of the bracket 57 enlarging the range of cameras which may be employed with the present device.

While there have been describd and illustrated preferred embodiments of the present invention it is apparent that numerous alterations, omissions, and additions may be made, without departing from the spirit thereof.

What is claimed is:

1. An improved coupling device of the character described comprising a camera mount, fastening means adapted to engage a camera body for releasably securing a camera to said camera mount, an arm projecting longitudinally forwardly from said camera mount, a post located on said arm and provided adjacent its free end with a releasably lockable support, a rod carried by said support and slidably longitudinally and axially rotatably adjustable therein, a leg projecting laterally from said rod and binocular engaging means carried by and adjustable along the length of said leg and adapted to releasably engage a binocular support frame.

2. An improved coupling device in accordance with claim 1 wherein said arm is laterally offset relative to said camera mount.

3. An improved coupling device in accordance with claim 1 wherein said arm is transversely offset relative to said camera mount.

4. An improved coupling device in accordance with claim 1 including a camera bracket located on said camera mount and comprising an end plate releasably secured to said mount and a base plate perpendicular to said end plate and having means for adjustably releasably engaging a camera.

5. An improved coupling device in accordance with claim 4 wherein said base plate has formed therein a longitudinally extending slot and longitudinally spaced transversely extending slots communicating with said longitudinal slot, and said camera engaging means includes a lock screw slideably registering with said slots.

6. A coupling device of the character described comprising a camera mounting plate carrying a first lock screw, a transversely laterally offset arm projecting longitudinally forwardly of said plate, a transversely extending post mounted on said arm and having formed therein a longitudinally extending opening and a communicating slot extending to the face of said post to delineate a pair of legs extending from said opening, a second lock screw engaging said legs and adapted to vary the size of said opening, a rod longitudinally slidable and rotatable in said opening and releasably fixable in a preset position by said second lock screw, a leg member projecting laterally from said rod and having an opening formed therein and a binocular lock screw registering with said opening and releasably engaging a correspondingly tapped bore formed in a binocular support frame.

7. A coupling device in accordance with claim 6 wherein said opening formed in said leg extends along the length thereof.

8. A coupling device in accordance with claim 6 including a camera bracket mounted on said plate and comprising an end wall releasably fastened to said plate, a base plate extending perpendicularly from said end wall and means for adjustably securing a camera to said base plate.

References Cited in the file of this patent
UNITED STATES PATENTS

| | | |
|---|---|---|
| 2,505,990 | Pollock | May 2, 1950 |
| 2,588,705 | Cuchet | Mar. 11, 1952 |
| 2,599,269 | Markle | June 3, 1952 |
| 2,765,718 | Beecher | Oct. 9, 1956 |
| 2,933,992 | Bushnell | Apr. 26, 1960 |